W. L. PATTERSON.
PROJECTION APPARATUS.
APPLICATION FILED SEPT. 21, 1914.
1,218,113.
Patented Mar. 6, 1917.
3 SHEETS—SHEET 3.
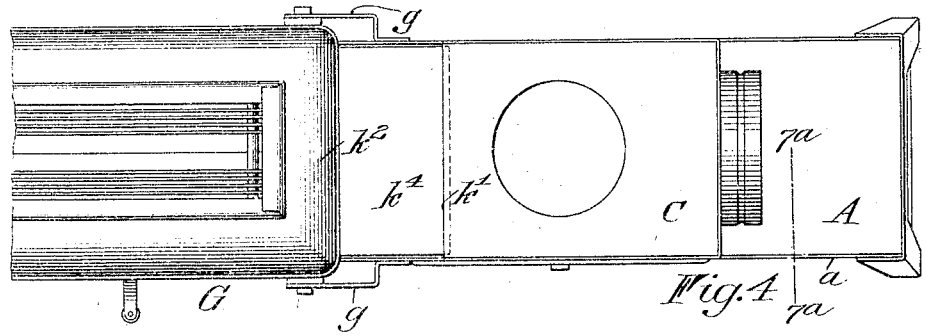
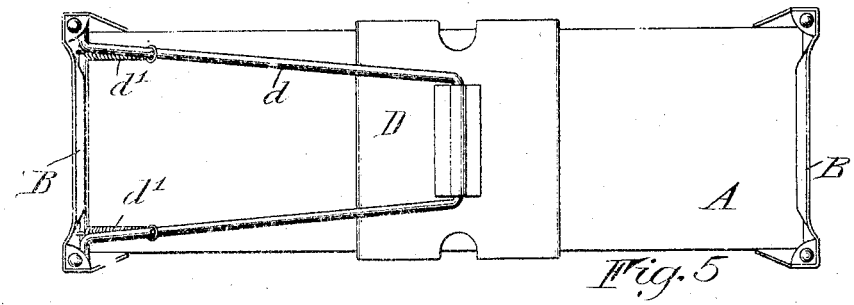
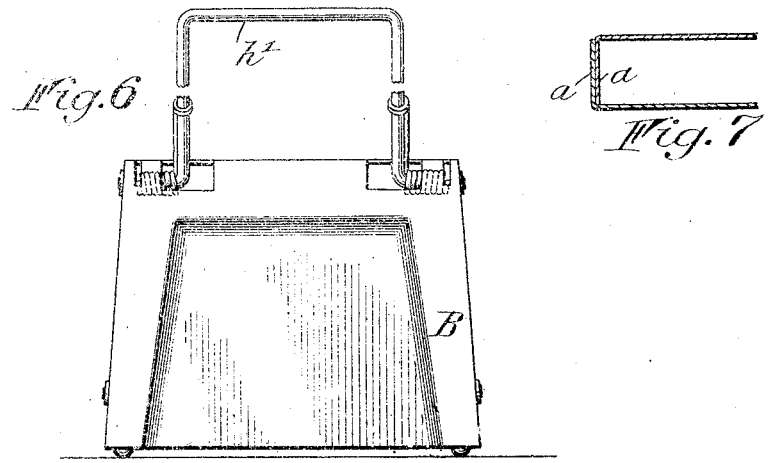
Inventor
William L. Patterson
Witnesses
Walter B. Payne
Nelson H. Opp
By Church & Rich
His Attorneys

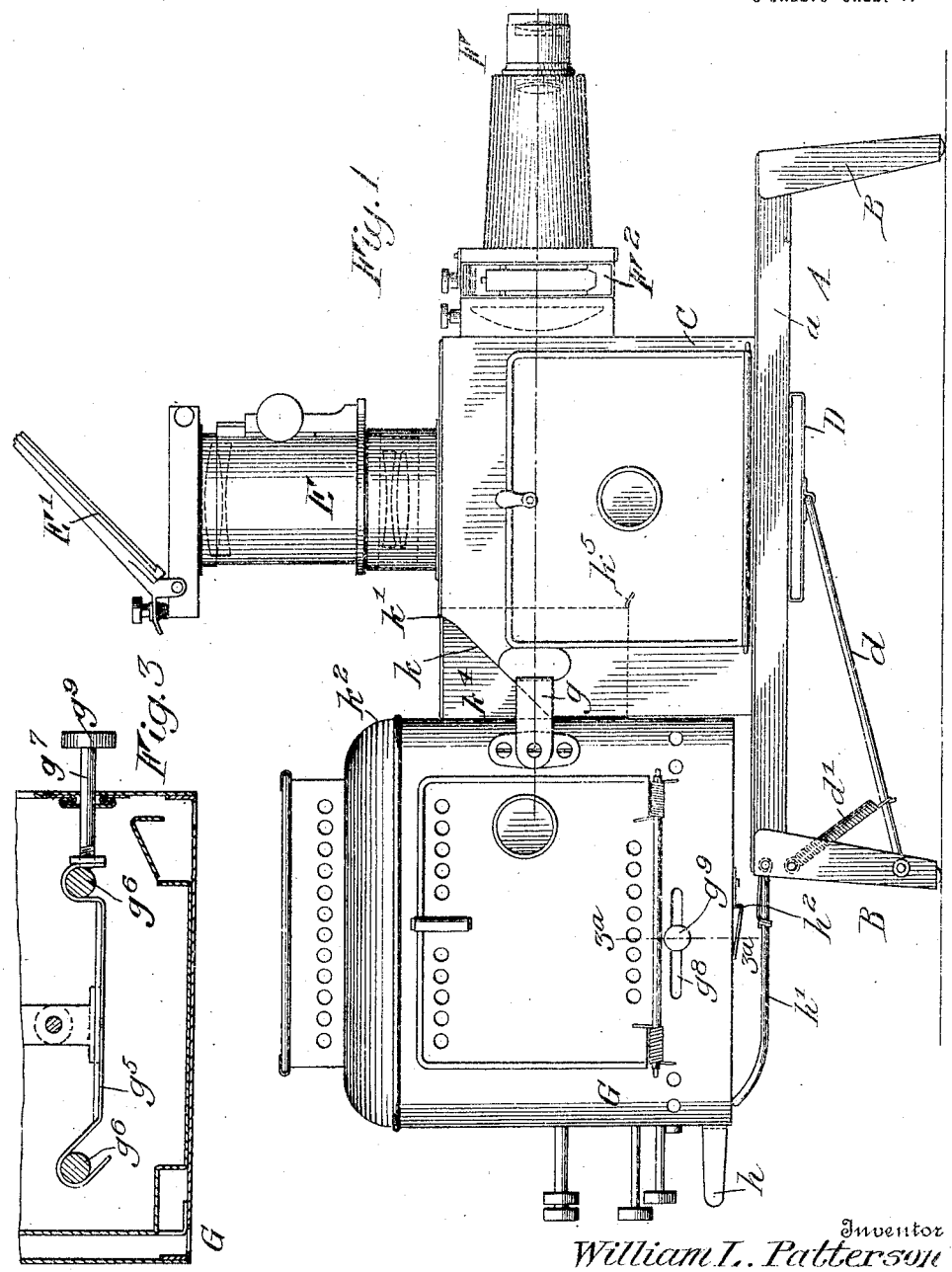

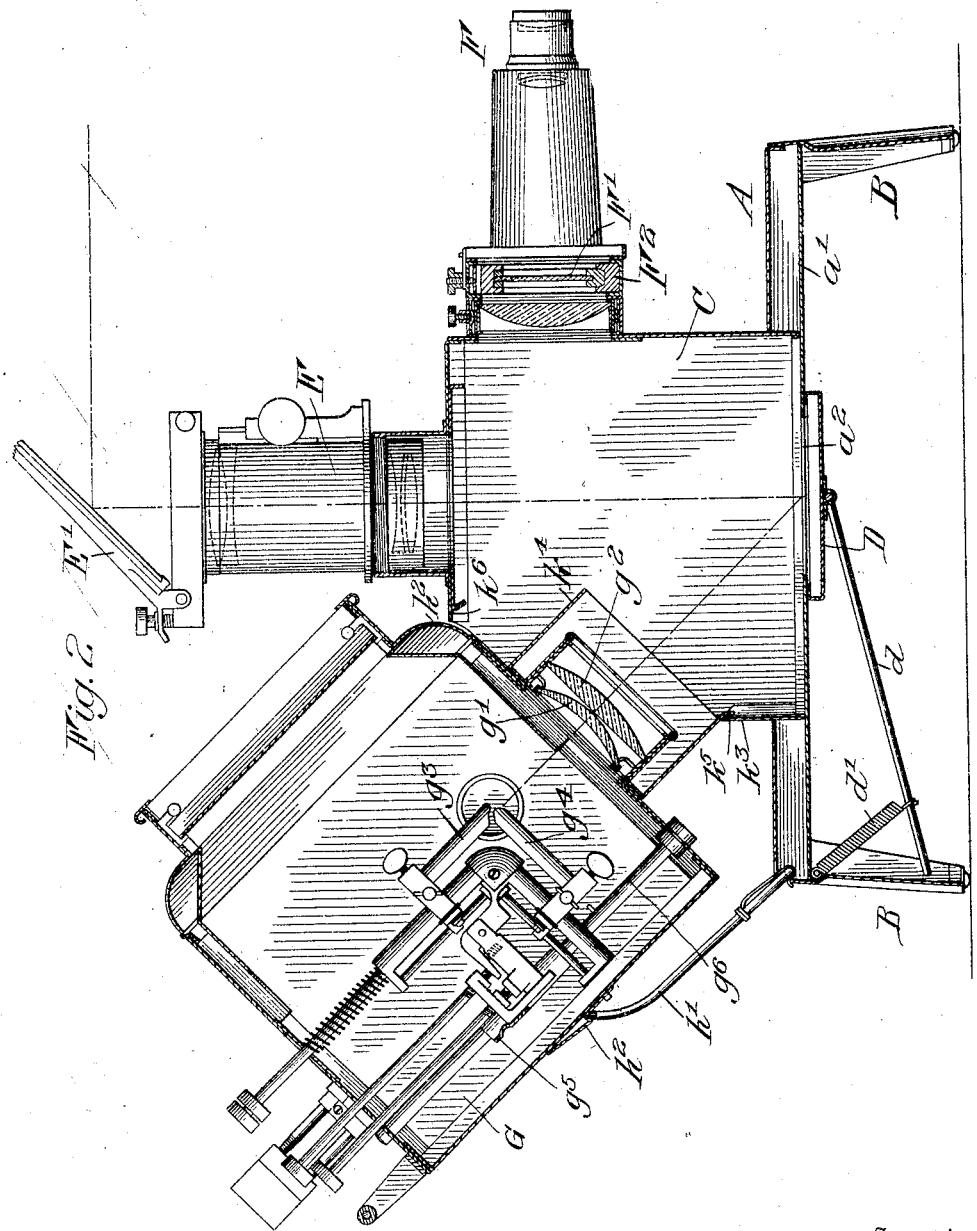

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

1,218,113.     Specification of Letters Patent.     Patented Mar. 6, 1917.

Application filed September 21, 1914. Serial No. 862,737.

*To all whom it may concern:*

Be it known that I, WILLIAM L. PATTERSON, of Rochester, in the county of Monroe and State of New York, have invented certain new and useful Improvements in Projection Apparatus; and I do hereby declare the following to be a full, clear, and exact description of the same, reference being had to the accompanying drawings, forming a part of this specification, and to the reference numerals marked thereon.

The present invention relates to projection apparatus of the type which contemplates the projection of images from opaque or transparent objects in different planes or positions, employing a plurality of relatively adjustable casings for changing the direction of the ray of light in accordance with the position of the object to be projected, and it has for its object to afford a construction that will effectively exclude exterior light from the interior of the casing in the different positions of adjustment. The invention also is designed with a view to affording an arrangement having other advantages as well as certain novel details of construction. To these and other ends the invention consists in certain improvements and combinations of parts, all as will be hereinafter more fully described, the novel features being pointed out in the claims at the end of the specification.

In the drawings:

Figure 1 is a side elevation of an apparatus constructed in accordance with the invention.

Fig. 2 is a longitudinal sectional view of the same.

Fig. 3 is a transverse sectional view on the line $3^a$—$3^a$ of Fig. 1.

Fig. 4 is a plan view.

Fig. 5 is a bottom plan view.

Fig. 6 is an end elevation of the frame, and

Fig. 7 is a sectional view on the line $7^a$—$7^a$ of Fig. 4.

Similar reference characters throughout the several views indicate the same parts.

In the present embodiment of the apparatus there is employed a base frame A that is formed of sheet metal, the top portion of the frame being preferably constructed in the manner shown in Fig. 7, of two metal sheets or plates which are located in spaced relation to each other and have overlapping portions designated at $a$ that are suitably secured together to form the sides. The frame also includes supports or legs B which are attached to the ends of the top portion.

Suitably supported upon the frame A is a stationary casing C adapted to receive the object, the image of which is to be projected, the object being supported in visible relation to the stationary casing. The casing C is open at the bottom and is supported upon the lower wall $a'$ of the top portion of the frame A. For the projection of opaque objects, the wall $a'$ is provided with an opening $a^2$ adjacent to which the object is to be supported, and for this purpose I employ an object holder which is mounted on a substantially U-shaped wire support $d$, the arms of which are pivotally arranged on the frame. The object holder is held in its normal position as shown in Fig. 2 by means of springs $d'$ which are connected to the frame and to the arms of the U-shaped support.

E designates a projector for receiving the image from the object on the object holder D, while E' is a mirror or reflector for transferring the image to a screen. F is a projector for receiving the image from a transparent object on the slide F' which may be positioned in the slide carrier $F^2$. The ray of light may be directed into either of the projectors just mentioned through the medium of an adjustable casing that is arranged to be moved with relation to the stationary casing so as to illuminate either the opaque or the transparent object and I will now describe the construction and arrangement of the adjustable casing and its relation to the stationary casing whereby exterior light is excluded from the interior of the latter.

The adjustable casing is designated at G, being pivotally mounted on the arms $g$ and arranged to swing from the position shown in Fig. 1 to that appearing in Fig. 2 whereby to direct a ray of light either downwardly onto the opaque object holder or horizontally to the transparent object holder. $g'$ and $g^2$ are condensing lenses arranged in the adjustable casing, through which the ray of light is directed from an illuminator which preferably embodies a pair of carbon electrodes $g^3$ and $g^4$. The illuminator is mounted on a frame $g^5$ which is adjustable on guides $g^6$. In order to effect longitudinal adjustment of the illuminator from the front of the machine, I employ an operating rod $g^7$ which is connected to the frame $g^5$ and extends through a slot $g^8$ in the casing G, being provided at its outer end with a handle portion $g^9$. By manipulating the handle portion $g^9$, which is conveniently disposed at the front of the casing within easy reach of the operator, the illuminator may be moved until it is in the desired position with relation to the condenser. $h$ designates a handle on the adjustable casing for raising it to its elevated position while $h'$ is a spring actuated locking member that coöperates with an abutment $h^2$ on the casing for holding the latter elevated in the manner shown in Fig. 2.

It is highly important that the connection between the stationary and the adjustable casings be such as to prevent the admission of light from the outside, to the interior of the casings. To this end I provide the casings with rigid coöperating walls that contact in such a manner as to form a close, light excluding engagement between the casings for either operative position. This may be accomplished in other ways than that which I am about to describe, but I prefer to attain the result by cutting away the stationary casing upon a diagonal line as shown at $k$ forming an upper edge $k'$ against which the upper portion $k^2$ of the adjustable casing contacts when the latter is elevated. At its lower part, the stationary casing is provided with the upstanding wall $k^3$, and $k^4$ is a hood surrounding the condenser and extending beyond the side wall of the adjusting casing, provided with a flange $k^5$ which engages within the wall $k^3$ when the adjustable casing is elevated as shown in Fig. 2. When the adjustable casing is lowered, the uppermost wall of the hood $k^4$ engages the under surface $k^6$ of the upper wall of the stationary casing. With this arrangement, there is no possibility of admitting any substantial amount of exterior light to the interior of the casing, in either of the operative positions of the adjustable casing, and at the same time the parts can be readily operated and adjusted and are constructed in an extremely simple manner.

The machine which I have described affords a very neat and compact arrangement that can be economically manufactured, and possesses the requisite degree of strength in its various parts while at the same time affording a novel arrangement that is characterized by marked advantages in the operation of the apparatus.

I claim as my invention:

1. In a projection apparatus, the combination with a frame and stationary casing, of means for supporting an object in visible relation to the stationary casing, an adjustable casing provided with a condenser, and an illuminator for the adjustable casing, the adjustable casing being provided with rigid walls that engage the stationary casing closely in any operative position to exclude exterior light.

2. In a projection apparatus, the combination with a frame and a stationary casing, of means for supporting an object in visible relation to the stationary casing, an adjustable casing, an illuminator for the adjustable casing, and rigid means mounted on one of the casings and serving to connect the casings closely in any operative position to exclude exterior light.

3. In a projection apparatus, the combination with a frame and a stationary casing, of means for supporting an object in visible relation to the stationary casing, an adjustable casing, an illuminator for the adjustable casing and a condenser arranged in the adjustable casing, a hood surrounding and extending beyond the condenser, and rigid walls on the stationary casing against which said hood and the adjustable casing engage to exclude exterior light in any operative position.

4. In a projection apparatus, the combination with a frame and a casing having an opening in one wall thereof, of a U-shaped support having its arms pivoted on the frame, an object holder mounted on the support and normally located adjacent said opening, and springs connecting the support and the frame.

5. A frame for projection apparatus consisting of a top portion having upper and lower sheet metal plates arranged in spaced relation to each other and overlapping to form side walls, of a casing, an object holder mounted in visible relation to the casing, a projector, and an illuminator coöperating with the casing.

6. A frame for projection apparatus, consisting of a top portion having upper and lower sheet metal plates arranged in spaced relation to each other, and overlapping to form side walls, of a casing, a projector, and an illuminator coöperating with the casing.

7. In a projection apparatus, the combination with a frame and stationary casing, an adjustable casing, an illuminator for the adjustable casing, and rigid light excluding walls on the adjustable casing having engagement with rigid light excluding walls on the stationary casing in either of the operative positions of adjustment, and serving to exclude light from within the casing.

WILLIAM L. PATTERSON

Witnesses:
WILLIAM G. WOODWORTH.
HENRY C. THOM.